United States Patent [19]

Pappenhagen et al.

[11] 3,903,262

[45] Sept. 2, 1975

[54] PHARMACEUTICAL COMPOSITIONS COMPRISING INTRAVENOUSLY INJECTABLE MODIFIED SERUM GLOBULIN, ITS PRODUCTION AND USE

[75] Inventors: Albert R. Pappenhagen, Moraga; John L. Lundblad, El Cerrito; Duane D. Schroeder, Orinda, all of Calif.

[73] Assignee: Cutter Laboratories, Inc., Berkeley, Calif.

[22] Filed: May 24, 1974

[21] Appl. No.: 473,209

Related U.S. Application Data

[63] Continuation-in-part of Ser. No. 234,006, March 13, 1972, abandoned.

[52] U.S. Cl. .................... 424/85; 260/112; 424/86; 424/87
[51] Int. Cl.² ............................................ A61K 23/02
[58] Field of Search .............................. 424/85–87; 260/112

[56] References Cited
OTHER PUBLICATIONS

Gunewardena et al., Biochem. J. 99(1): 8P (1966), 1,4-Dithiothreitol as a Reagent for the Reducting Degravation of Human γG globulin, Chem. Abst. 65, No. 1215b (1966).
Miller et al., J. Biol. Chem. 240(12): 4740–4745, Dec., 1965, Characterization of a Human Macroglobulin II, Distribution of the Disulfide Bonds, Chem. Abst. 63, No. 16646a (1965).
Cutter, "Human Plasma Fractionation," Dec. 1, 1965, p. 4, Immune Serum Globulin–Gamma Globulin, Cutter, Hyper-Tet Tetanis Immune Globulin–Human.
Barandon et al., Vox. Sang. 7: 157–174 (1962), "Intravenous Administration of Human γ-Globulin."

*Primary Examiner*—Shep K. Rose
*Attorney, Agent, or Firm*—Miller, Raptes & White

[57] ABSTRACT

A pharmaceutical composition comprising, in a pharmaceutically acceptable aqueous carrier adapted for intravenous administration, an intravenously injectable, substantially pure modified immune serum globulin consisting essentially of intact immune serum globulin chains having intact intrachain disulfide linkages and cleaved at at least one interchain disulfide linkage, each cleaved disulfide linkage being replaced by a pair of alkylated mercapto groups, the cleaved chains remaining united by non-covalent association so that the apparent molecular weight of the modified serum globulin in non-dissociating solvents is substantially the same as unmodified immune serum globulin, said modified immune serum globulin being substantially free from both actual and latent anti-complement activity and having substantially the biological half-life and spectrum of antibody activity of corresponding unmodified immune serum globulin, said modified immune serum globulin having an $H_2L_2$ content of less than 7 percent, an $H_2L_2 + H_2L + H_2$ content of 5–30 percent and an $HL + H + L$ content of 95–70 percent wherein H is an intact heavy chain and L an intact light chain, and having an S-alkylated cysteine content of about 5.6–9.5 moles per mole of immune serum globulin; said modified immune serum globulin being produced by selectively reducing a mildly alkaline aqueous solution of an immune serum globulin with dithiothreitol or dithioerythritol, alkylating the thus-reduced interchain disulfide groups, and separating the thus-modified globulin from the non-proteinaceous reaction products.

20 Claims, 4 Drawing Figures

PHARMACEUTICAL COMPOSITIONS COMPRISING INTRAVENOUSLY INJECTABLE MODIFIED SERUM GLOBULIN, ITS PRODUCTION AND USE

This is a continuation-in-part of Application Ser. No. 234,006, filed Mar. 13, 1972, now abandoned.

BACKGROUND OF THE INVENTION

This invention relates to pharmaceutical compositions comprising novel intravenously injectable modified immune serum globulin, to a process for its production and to its use to administer immune serum globulin intravenously for human therapy.

Intramuscularly injectable gamma globulin preparations are known. One such product is "Hyper-tet" (Cutter Laboratories, Inc., Berkeley, Cal.).

The usual intramuscular gamma globulin preparations cannot safely be administered intravenously because such administration causes a rather high incidence of reactions, especially in agammaglobulinemic recipients. These reactions have been associated with a decrease in serum complement levels, apparently caused by complement binding by the administered gamma globulin. S. Barandun et al., Vox Sang. 7, 157–174 (1962). The ability of gamma globulin to bind complement, termed anticomplementary, is greatly increased as a result of denaturation brought about during the fractionation procedure, in particular by aggregation to high molecular weight species. The complement binding mechanism of these aggregates appears to be identical to that of antigen-antibody complexes. D. M. Marcus, J. Immunol. 84, 273–284 (1960). When the aggregates are removed by ultracentrifugation at 100,000 ¼ gravity, a product low in anticomplement activity is obtained which is well tolerated upon intravenous injection. Barandun et al., supra.

Several approaches have been taken to the problem of rendering gamma globulin safe for intravenous administration. All of these are dependent on elminating its anticomplement activity. Ultracentrifugation (cited above) is technically unfeasible, and the product so derived might be expected to regain its anticomplement activity upon storage. Treatment of gamma globulin with the enzyme pepsin at pH 4.0 results in proteolytic cleavage of the molecule to give a fragment of about 100,000 molecular weight which has a sedimentation coefficient in the ultracentrifuge of about 5S. A. Nisonoff et al., Science, 132, 1770–1771 (1960). Even though this surviving fragment retains bivalent antibody activity and lacks anticomplement activity and is well tolerated and efficacious in intravenous administration, W. Baumgarten, Vox Sang. 13, 84 (1967), the therapeutic effect provided is of unacceptably short duration since it is rapidly excreted, having a circulating half-life of only 18 hours, perhaps somewhat longer in agammaglobulinemic patients, compared to 19.8 days for unmodified gamma globulin. E. Merler et al., Vox Sang. 13, 102 (1967); B. Jager, Arch. Intern, Med. 119, 60 (1967). Although the much reduced half-life of pepsin treated gamma globulin is probably due in part to the drastic reduction in size of the molecule, there are indications that the rate of catabolism of gamma globulin is related to specific properties of the portion of the molecule digested by pepsin. J. L Fahey et al., J. Exper. Med., 118, 845–868 (1963). This portion of the molecule remains intact in the present invention. An additional disadvantage of the pepsin treatment procedure is that the pepsin which remains present is of animal origin and can stimulate antibody production, particularly upon repeated administration. C. Blatrix et al., Presse Med. 77, 635–637 (1969). The use of plasmin of human origin avoids this difficulty and is the basis of a different process for preparation of intravenous gamma globulin.

Treatment of gamma globulin with human plasmin results in cleavage into three components of about 50,000 molecular weight. J. T. Sgouris, Vox Sang. 13, 71 (1967). When sufficiently low levels of plasmin are used, only about 15 percent of the molecules are cleaved, with 85 percent remaining as intact gamma globulin. Sgouris, supra. The intact gamma globulin remaining undigested shows little anticomplement activity and has been administered intravenously without adverse reactions. J. Hinman et al., Vox Sang. 13, 85 (1967). The material thus prepared appears to retain in vitro and in vivo protective activity. F. K. Fitzpatrick, Vox Sang, 13, 85 (1967). One disadvantage of this approach is that the plasmin cannot be completely removed. Thus, degradation continues even when the material is stored at 4 C.

Incubation of gamma globulin at pH 4.0 at 37 C. for various lengths of time has been observed to reduce the anticomplement activity to low levels. It has been suggested that this result may arise from a small quantity of serum enzyme present as an impurity in the gamma globulin. Blatrix et al., supra. As with the plasmin treated gamma globulin, this "pH 4.0 gamma globulin" has been found to regain anticomplement activity upon storage at an unpredictable rate, so that it is necessary to assay anticomplement activity before administration to a patient. J. Malgras et al., Rev. Franc. Trans., 13, 173 (1970).

Both plasmin treated gamma globulin, Hinman et al., supra, and pH 4.0 gamma globulin, H. Koblet et al., Vox Sang. 13, 93 (1967); J. V. Wells et al., Austr. Ann. Med. 18, 271 (1969), have shorter half-lives in vivo than unmodified gamma globulin. For example, the half-life in normal patients of pH 4.0 gamma globulin is about 14 days, Koblet et al., supra, while the plasmin treated material shows a half-life of 16 days, Merler et al., supra.

The Centre National de Transfusion Sanguine (C.N.T.S.) in Paris has, by careful fractionation and filtration of gamma globulin from selected fresh plasma, produced an intravenously injectable gamma globulin with low anticomplement activity. Blatrix et al., supra; ibid., Presse Med., 77, 159–161 (1969); M. Steinbuch et al., Vox Sang. 13, 103 (1967). It is apparently not totally devoid of anticomplement activity, as it must be administered carefully and reactions do occur in some patients. Cortisone may be given prior to injection to eliminate these reactions, but the apparent incomplete removal of anticomplement activity would seen to be detrimental to its widespread use.

The effects on anticomplement activity of reduction of disulfide linkages of gamma globulin followed by reaction with iodoacetamide has been investigated in the prior art. S. Barandun et al., supra, found that treatment of a 7 percent solution of gamma globulin with 0.2 M cysteamine, followed by 0.2 M iodoacetamide, resulted in almost complete loss of anticomplement activity whereas treatment with cysteamine or iodoacetamide alone did not significantly decrease anticomplement activity. Because of the toxicity of iodoacetamide, these investigators did not pursue this approach to an intravenously injectable gamma globulin.

B. Frangione and C. Milstein, J. Mol. Biol. 33, 893 (1968) report the treatment of a 1 percent gamma globulin solution with 0.65 mM of DTT for 90 minutes at 37 C. and subsequent alkylation with 1.6 mM of sodium iodoacetate followed by digestion with pepsin. The reduced and alkylated IgG, if it had been isolated and tested, would show a severely impaired spectrum of antibody function because of the reduction conditions employed.

Wiederman et al., Proc. Soc. Exp. Biol. Med. 113, 609–613 (1963), showed that treatment of gamma globulin with 0.1 M mercaptoethanol, followed by prolonged dialysis against 0.02 M iodoacetamide resulted in an ISG solution which, when mixed with antigen, would not fix complement whereas the modified ISG of this invention does. It is the ISG antigen complement complex which is believed to be the form by which antigens are destroyed by body cells. An ISG-antigen complex is undesirable since the complex is reversible and thus capable of releasing the bound antigen, thereby permitting it to proliferate in the body. Prior art has amply demonstrated that mercaptoethanol, J. B. Fleischman et al., Arch. Biochem. and Biophys. Supp. 1, 174–180 (1962) and mercaptoethylamine, G. M. Edelman, J. Am Chem. Soc. 81, 3155 (1959), at high molarities, are capable of reducing interchain disulfide bonds of gamma globulin. The disulfide bonds which are more labile to mercaptan reduction appear to be related to complement fixation, while the disulfide bonds which are more resistant to reduction by mercaptan appear to be related to interaction with antigen, P. H. Schur et al., J. Exp. Med., 120, 531 (1964). The disadvantages inherent in the use of high (0.1 – 0.5M) concentrations of mercaptans for the reduction of interchain disulfide bonds in gamma globulin are eliminated by employing as the reducing agent limited concentrations of dithiothreitol (DTT) or dithioerythritol (DTE). W. W. Cleland, Biochem. 3, 480 (1964). Since DTT is oxidized irreversibly to form a stable six-membered ring, near stoichiometric amounts of this reducing agent can be employed and the use of a large excess of mercaptan is avoided. Virtually complete reduction of all of the disulfide bonds of human gamma globulin has been achieved by the action of 0.0125M DTT on a 2 percent gamma globulin solution, a molar ratio of reducing agent to protein of about 800:1. P. Gunewardena et al., Biochem. Journ. 99, 8 (1966). The publication does not report what the effect of such reduction and subsequent alkylation with iodoacetamide was on the antibody levels, but the complete reduction reported would destroy all antibody activity. Miller et al., J. Biol. Chem., 240(12): 4740–5 (Dec. 1965), similarly used a huge excess of DDT to reduce IgM protein rather than IgG.

Notwithstanding these extensive investigations into the possibility of modifying immune serum globulin so as to eliminate anticomplement activity, no commercially acceptable modified immune serum globulin is believed to be known which (a) is substantially free from both actual and latent anti-complement activity, (b) has substantially the biological half-life and antibody activity of unmodified immune serum globulin, and (c) is free from non-proteinaceous reaction products and is intravenously injectable, substantially pure.

According to this invention, there is provided pharmaceutical compositions adapted for intravenous administration comprising novel intravenously injectable, substantially pure modified immune serum globulin which is substantially free of actual and latent anticomplement activity and which has substantially the biological half-life and antibody activity of unmodified immune serum globulin.

SUMMARY OF THE INVENTION

The pharmaceutical compositions of this invention comprise, in a pharmaceutically acceptable aqueous carrier adapted for intravenous administration, an intravenously injectable, substantially pure modified immune serum globulin consisting essentially of intact immune serum globulin chains having intact intrachain disulfide linkages and cleaved at at least one interchain disulfide linkage, each cleaved disulfide linkage being replaced by a pair of alkylated mercapto groups, the cleaved chains remaining united by non-covalent association so that the apparent molecular weight of the modified serum globulin in non-dissociating solvents is substantially the same as unmodified immune serum globulin, said modified immune serum globulin being substantially free from both actual and latent anti-complement activity and having substantially the biological half-life and spectrum of antibody activity of corresponding unmodified immune serum globulin, said modified immune serum globulin having an $H_2L_2$ content of less than 7 percent, an $H_2L_2 + H_2L + H_2$ content of 5–30 percent and an $HL + H + L$ content of 95–70 percent wherein H is an intact heavy chain and L an intact light chain, and having an S-alkylated cysteine content of about 5.6–9.5 moles per mole immune serum globulin.

THE DRAWINGS

Figure 3:
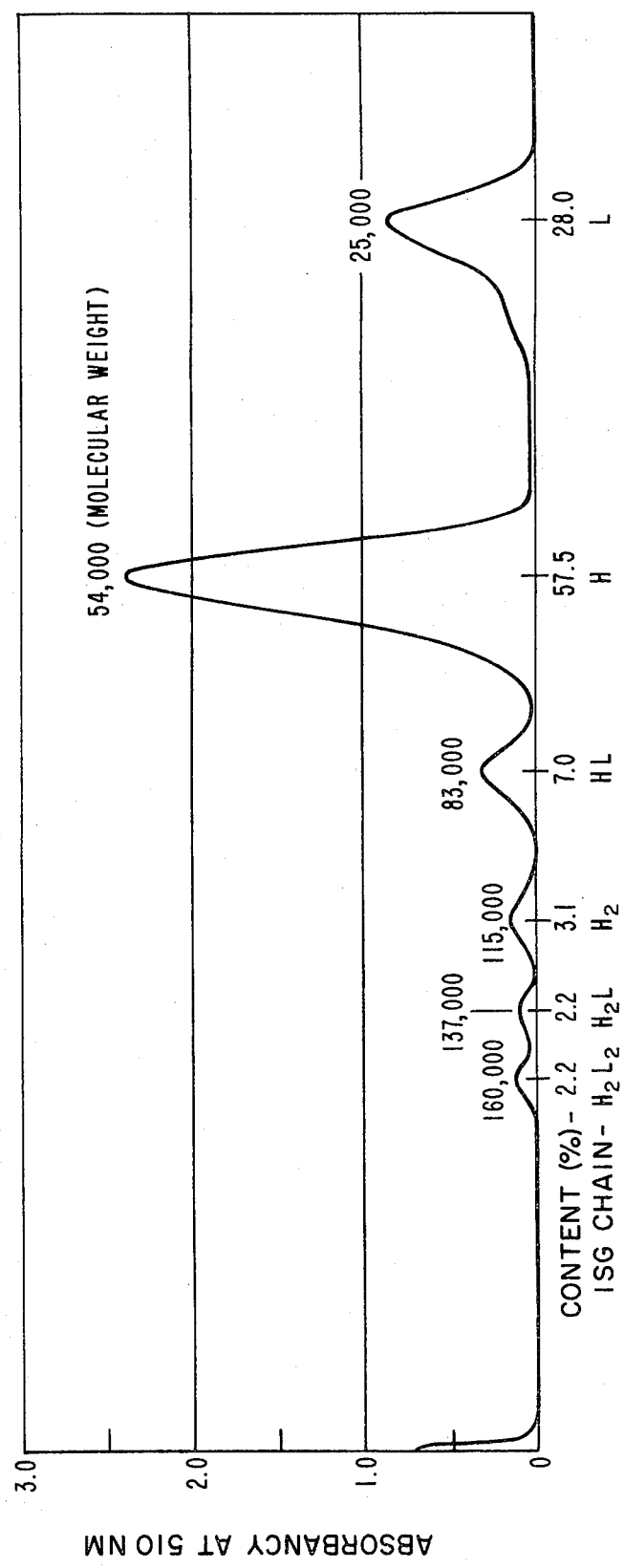
Figure 4:
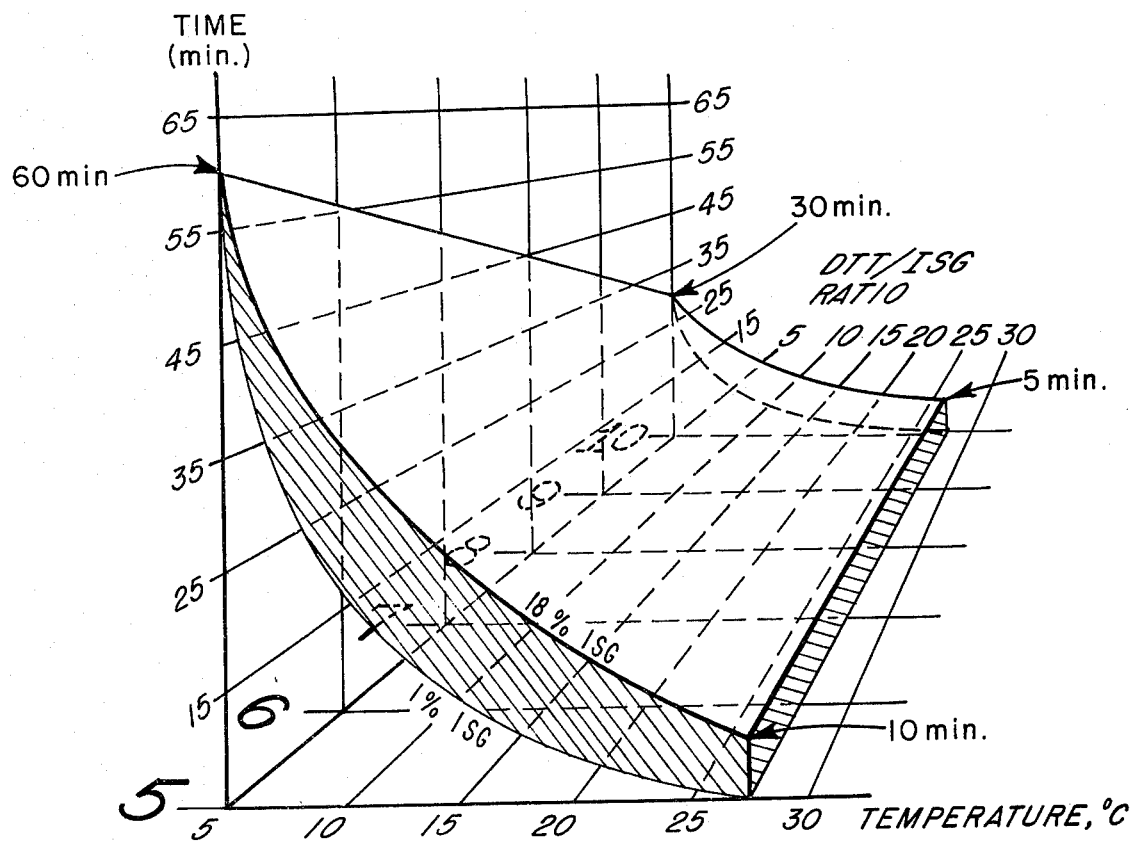

FIG. 3 is the gel electrophoretic pattern of the modified immune serum globulin of Example 8C showing the molecular weight distribution thereof after dissociation, the peaks representing adsorption at 570 nm and the areas under the peaks representing the relative proportions of the various globulin chains of the sample; and FIG. 4 is a three-dimensional view of the area within which the variables of protein concentration, molar ratio of reducing agent to protein, reaction time and reaction temperature should be maintained in order to ensure production of the modified immune serum globulin of this invention.

DETAILED DISCUSSION

The novel injectable modified immune serum globulin of this invention is characterized by being substantially unchanged in physical measurements and biological functions and lacking anticomplement activity, but being chemically distinguishable by consisting essentially, i.e., more than 93 percent, of intact immune serum globulin chains having intact intrachain disulfide linkages and which have been cleaved at at least one interchain disulfide linkage, which is replaced by a pair of alkylated mercapto groups. The ISG molecule chemically is otherwise substantially unchanged. The reduction of at least one interchain disulfide linkage and subsequent alkylation of the mercapto groups thus produced substantially eliminates anticomplement activity. The reduction of an interchain disulfide group is necessary for the elimination of complement binding activity and the alkylation of the thus-produced mercapto groups precludes reappearance of anticomplement activity. Because the selective reduction and alkylation reactions of this invention affect interchain disulfide linkages and leave intrachain disulfide linkages substantially unaffected, the protein molecule is not fragmented and the antibody potency of the modified immune serum globulin remains essentially intact. Retaining the remainder of the molecule substantially unchanged also retains the biological half-life of the modified immune serum globulin subsequent to its infusion into human recipients.

Starting Material

The starting material for the process of this invention is unmodified human immune serum globulin (ISG). In the specification and claims the term "immune serum globulin" is used to define the substance also referred to in the literature variously as gamma globulin, -globulin, IgG and immunoglobulin G. It consists predominantly and preferably of at least about 85 percent of the 7S species of gamma globulin, which has a molecular weight of about 160,000. Any remainder is preferably 9S species, with a molecular weight of about 300,000. Both standard immune and hyperimmune serum globulins, e.g., tetanus, rabies and hepatitis immune serum globulins, can be employed, the modified product being immune and hyperimmune ISG, respectively. Thus, a suitable starting material for the process of this invention is Cohn's Fraction II, FIGS. 5 and 6. See Cohn, E. J., et al., J. Am. Chem. Soc. 68, 459 (1946); Oncley et al., ibid., 71, 541 (1949).

Fraction II, by ultracentrifugation studies, is predominantly (about 85 percent) the 7S (sedimentation constant of 7) species or gamma globulin with an average molecular weight of 160,000. The remaining protein is essentially 9S material with a M.W. of about 300,000. Wet Fraction II paste (approximately 30 percent solids) is commonly lyophilized to obtain dry ISG powder which is then dissolved and prepared for intramuscular injection as a 16.5 percent sterile solution. Either the wet Fraction II paste or the dry ISG powder (before or after dissolving in a suitable aqueous vehicle) is a suitable starting material for the process of this invention.

Immune serum globulin is formed of two identical heavy chains (H), each of a molecular weight of about 55,000, joined by 2 (in $IgG_1$ and $IgG_4$ classes), 4 (in $IgG_2$ class) or 5 (in $IgG_3$ class) interchain disulfide linkages and a pair of identical light chains (L), each of a molecular weight of about 25,000 and each joined to one of the heavy chains by a single interchain disulfide linkage. Thus, unmodified serum globulin thus is a symmetrical molecule which can be designated by chains as $H_2L_2$. It has an average of about 4.75 interchain disulfide linkages per molecule, due to the fact that about 35 percent of the molecules have 4 or 5 rather than 2 disulfide linkages joining the heavy chains.

Gamma globulin obtained by any process which has essentially the same composition of protein components as found in the Cohn Fraction II can be used as starting material in our chemical modification process. Blood plasma or whole serum are also rendered essentially free of anticomplement activity by our chemical modification process.

Both standard immune serum globulin and hyperimmune serum globulin can be employed as starting materials. As is well known, the latter is produced from plasma or serum obtained from selected donors who have much higher titers for a specific antibody than is normally found in the average population. These donors have either been recently immunized with a particular vaccine or else they have recently recovered from an infection or disease. These high titer sera or plasmas are pooled and subjected to the usual Cohn fractionation procedures up to the point of isolating Fraction II. The Bureau of Biologics (BOB) antibody standards for hyperimmune serum globulins presently are based on products to be given intramuscularly. These standards are based on the assumption a standard intramuscular dose of the reconstituted globulin (1–10cc.) will be administered. Because the amount of antibody required to achieve a desired immunological response is substantially less when administered intravenously, it will be apparent the I.V. dose will be substantially less than the I.M. dose which will produce the same serum antibody titer. Thus, the dose of intramuscular ISG and hyperimmune serum globulin must be higher than that required to achieve the same serum antibody titer when globulin of the same antibody activity is administered intravenously.

The starting wet paste or lyophilized powder is dissolved in a volume of water, preferably an aqueous solution of glycine and NaCl, to provide a protein solution of the desired concentration, usually 1 to 18 percent, e.g., 3, 5, 10 and 16.5 percent, preferably about 5 percent. Surprisingly, whereas solutions of unmodified ISG are most stable at high, e.g., 16–18 percent, concentrations, solutions of the novel modified ISG of this invention are stable at substantially lower, e.g., 10 percent, concentrations. Glycine and NaCl, although not essential, are preferably included to help stabilize the protein solution. The glycine can be in any concentration up to about 1.0 M. The NaCl solution is preferably about 0.075 M. After the protein has been dissolved, the solution is adjusted to the desired mildly alkaline pH, i.e., about 7.2 to 9, preferably about 8.0 to 8.6, more preferably about 8.0 to 8.2, by the addition of sodium hydroxide or other base. If the solution is not clear at this stage, it preferably is clarified prior to the reduction step.

Reduction Step

In the first step of the process of this invention, at least one of only interchain disulfide linkages in substantially all (93 percent) of the molecules of the starting immune serum globulin is selectively reduced with dithiothreitol or dithioerythritol. Dithioerythritol (DTE) is a chemical equivalent of dithiothreitol (DTT) and in each of the examples hereinafter where DTT is employed, the latter may be substituted for the former. This is conveniently achieved by reducing a total of about 2.8 to about 4.75, preferably 3.0 to 4.5, more preferably about 3.75–4.25, interchain disulfide linkages to form about 5.6 to about 9.5 —SH groups.

If all of the immune serum globulin molecules contained only four interchain disulfide linkages, i.e., one connecting one of the two light chains to one of the two heavy chains and two connecting the two heavy chains to each other, the theoretical number of molar equivalents of reducing agent required to cleave all interchain disulfide linkages would, of course, be four. However, normal human IgG consists of four subclasses, only two of which, viz., $IgG_1$ and $IgG_4$, have two S—S bonds joining heavy chains. The other two, viz., $IgG_2$ and $IgG_3$, have four and five disulfide bonds, respectively, joining the two heavy chains. Frangione et al., Nature (1969) 221, page 145. The proportions of these subclasses, viz., $IgG_1$, 60.9 percent; $IgG_2$, 29.6 percent; $IgG_3$, 5.3 percent; and $IgG_4$, 4.2 percent, was determined by Morell et al., J. Immunol. (1972) 108, page 195. In these proportions, the molar proportion of reducing agent to IgG theoretically required to cleave all interchain disulfide linkages is $4 \times 0.609 + 6 \times 0.296 + 7 \times 0.053 + 4 \times 0.042 = 4.75$.

Figure 1:
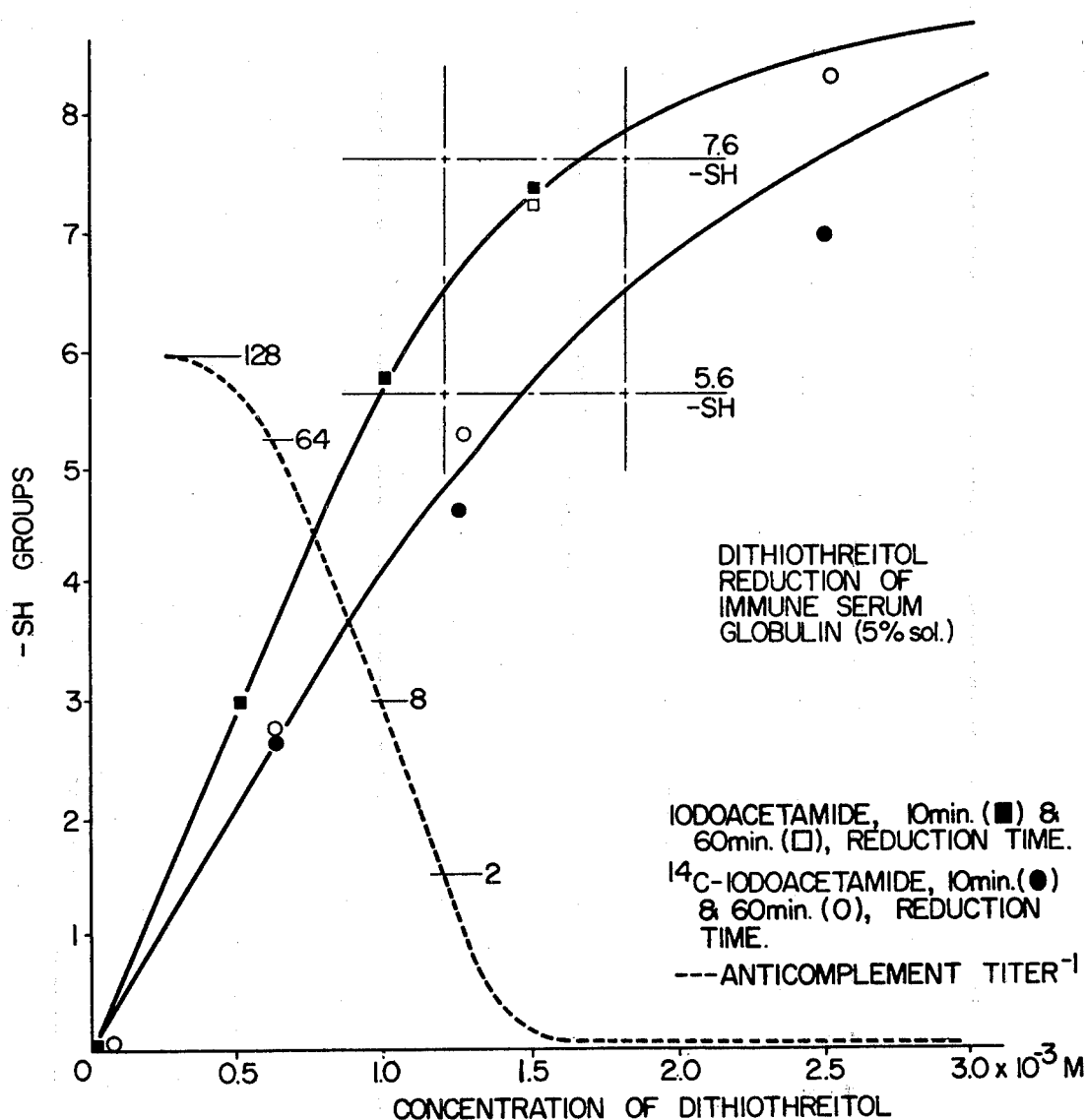
FIG. 1 is a graph showing the relationship between the number of —SH groups blocked and the resulting anticomplement titer of the novel modified immune serum globulin when the modifying reaction is performed at various dithiothreitol concentrations and reaction times.

As shown in FIG. 1, actual and latent anticomplement activity can be eliminated by selective reduction followed by alkylation of about three of the interchain disulfide linkages per molecule of ISG. Reduction (and subsequent alkylation) of an average of only about one disulfide linkage has no demonstrable effect on the complement binding activity of immune serum globulin. Reduction of an average of 2.5 disulfide groups drastically reduces anticomplement activity. However, to eliminate anticomplement substantially completely usually requires the reduction of about 2.8 or more disulfide groups. Reduction of up to an average of about 4.75 disulfide linkages is not detrimental to antibody function and such a level of reduction (and subsequent alkylation) assures that the desired complete elimination of actual and latent anticomplement activity is always attained without causing reduction of the less reactive intrachain disulfide bonds which are essential for biological activity. Reduction (and subsequent alkylation) of more than 4.75 disulfide linkages has no further beneficial effect on gamma globulin for intravenous use and, in fact, results in partial or complete destruction of biological function.

The desired selective reduction of 2.5–4.75 interchain disulfide linkages is achieved by a combination of the concentration of protein in the reaction mixture, the molar proportion of DTT or DTE to starting protein and reaction time, temperature, and pH.

The reduction step is conducted at about room temperature or with cooling, or at most very mild heating, e.g., from about 0–30 C., preferably 20 to 28 C., i.e., at about room temperature, since cooling does not appear to have any measurable beneficial effect. At temperatures below room temperature, higher concentrations of DTT or DTE are required to achieve the same degree of reduction. Indirect analyses show that at room temperature, pH 8.2 and at 5 percent protein concentrations, about 60 percent of the DTT or DTE (at 0.0015M) has reacted in 10 min. and 65 percent in 60 min. These figures indicate that the extent of reaction under a given set of conditions of pH and concentration of protein and DTT is essentially independent of reaction time. Thus, at room temperature, the reaction can be conducted for any convenient length of time, e.g., about 2 minutes to 2 hours or longer. However, at temperatures above about 28 C., the selectivity of the reduction becomes increasingly impared with resulting adverse effect upon antibody activity of the final product. Therefore, at elevated temperatures, if an amount of reducing agent is employed, in excess of that theoretically required to achieve the desired degree of disulfide cleavage, the course of the reaction must be followed and terminated by destruction of the excess reducing agent when the desired number of —SH groups have been produced. Even at room temperature, reduction of intrachain disulfide linkages occurs in the presence of excess reducing agent. Therefore, only the theoretical amount of reducing agent is preferably employed.

The reduction is preferably conducted at a mildly alkaline pH, e.g., about 7.2–9, preferably about 8–8.6. At lower pH, the reaction rate for both reducing and alkylating agents is markedly decreased. Thus, at a pH below 8, somewhat higher temperatures, longer reaction times and/or higher DTT and DTE concentrations are required. A significantly higher pH tends to denature the immune serum globulin. A physiologically acceptable buffer is preferably employed to maintain the desired pH because subsequent complete removal is less critical.

The DTT or DTE can be added as a solution to the protein solution, or vice versa, or as a solid to the protein solution. Alternatively and less desirably, the protein can be dissolved in the DTT or DTE solution or the protein and DTT or DTE dry mixed and then dissolved simultaneously in the aqueous reaction solvent to the desired protein concentrations, e.g., at least about 1 percent, preferably about 5–18 percent.

The course of the reaction can be monitored, if desired, by monitoring the reaction mixture for residual reducing agent. When reducing agent is no longer being consumed, the reaction is complete.

The reaction can be conveniently conducted in air. This results in the autooxidation of a minor proportion of reducing agent, which is compensated for by the use of slightly more than the theoretical molar ratio. If desired, the reaction can also be conducted in an inert atmosphere, e.g., nitrogen.

The molar proportion of reducing agent to protein employed is dependent in part on the protein concentration in the reaction mixture, pH, the reaction time, the reaction temperature and reaction atmosphere. At least one molar equivalent of DTT or DTE is theoretically required to reduce one disulfide linkage per mole of protein and produce 2 —SH groups. Therefore, the theoretical minimum amount of reducing agent required to reduce each disulfide linkage is at least one molar equivalent. Because, as stated above (also see FIG. 1), reduction of about 2.8 disulfide linkages (and subsequent alkylation of the SH groups) is required for the elimination of anticomplement activity, at least 3 molar equivalents of DTT or DTE are required to substantially eliminate anticomplement activity, even under optimum conditions. In the process of this invention, although about 2.5 to 50 molar equivalents of reducing agent can be employed, preferably at least about 3 and usually less than 10, e.g., 4–6, most preferably about 5, molar equivalents of reducing agent are employed to achieve the desired reduction in a reasonable length of time at the preferred conditions of protein concentration, pH and reaction temperature.

Assuming an average molecular weight of 160,000, the molarity of the preferred starting 5% protein solution is about $3 \times 10^{-4}M$. Therefore, to achieve the desired level of disulfide reduction, sufficient reducing agent should be added to 5% protein solution to bring its concentration therein to about $5 \times 10^{-4}$ to $25 \times 10^{-4}M$, preferably about $15 \times 10^{-4}M$.

The reduction reaction can be conducted conveniently in air and in the examples described hereinafter, this is the reaction atmosphere. However, because a portion of the reducing agent is oxidized by air, more closely to theoretical amounts of reducing can be employed if the reduction step is conducted under nitrogen or other inert atmosphere.

Since the reduction step can be terminated at any time by the destruction of the reducing agent remaining in the reaction mixture, under most reaction conditions, an amount of reducing agent substantially in excess of that theoretically required to achieve the desired degree of reduction, e.g., 5–1,200 percent, preferably 10–100 percent excess, can be employed by terminating the reaction when the desired degree of reduction has been achieved. When using very large molar excesses of reducing agent, a lower reaction temperature, e.g., 0–5 C., a shorter reaction time, and/or lower pH, e.g., 7.2–7.8, is preferred to maintain reaction selectivity. When the molarity of the reducing agent is less than about $1.6 \times 10^{-3}$M, the reduction of 5 percent protein solution can usually be conducted for up to about one hour before reduction of more than 3 disulfide groups per molecule occurs. At about $1.6–1.8 \times 10^{-3}$M, the reaction usually must be terminated within about 30 minutes. At higher reducing agent concentrations, e.g., $2.0–2.5 \times 10^{-3}$M, the reaction should be terminated within 5–15 minutes. These reaction times are correspondingly reduced at temperatures higher than room temperature and vice versa at temperatures lower than room temperature. Also, at other protein concentrations than 5 percent and pH values other than about 8.0 to 8.6, adjustment of reaction time also will be required when using excess reducing agent. Generally, it is preferred to operate within the parameters of reaction variables shown in FIG. 4.

The above assumes that the molarity of the protein solution is such that the amount of reducing agent present in the reaction mixture is in excess of that required to reduce an average of about 4.75 disulfide groups per molecule, the maximum reduced in the process of this invention. If desired, the exact amount of reducing agent required to reduce the preferred about 3.75 to 4.25 disulfide linkages, e.g., 3.0 to 4.5, and thus produce an average of 6.0 to 9.0 —SH groups per molecule under the selected reaction conditions, can be determined with an aliquot of the starting ISG. In such a case, the extent of —SH group formation would be essentially independent of reduction time and any reaction time greater than the minimums shown in FIG. 4 can be employed.

The reducing agent usually should be present in the reaction mixture at a concentration of at least $5.0 \times 10^{-4}$M and usually less than $1 \times 10^{-2}$M, e.g., about $1.2 \times 10^{-3}$M, preferably $1.2 – 1.8 \times 10^{-3}$M, when reducing about a 5 percent protein solution for a short time at about room temperature. The amount of reducing agent required to produce this initial molarity can be added all at once or continuously or batchwise over the course of the reaction.

The relationship between reducing agent (DTT) concentration and reaction time is illustated in FIG. 1 of the drawings, which shows the result of reducing a 5 percent solution of immune serum globulin with DTT at various concentrations in the reaction mixture. As shown in the drawing, with 5 percent ISG the reduction of the minimum 2.5 disulfide linkages to 5 —SH groups per molecule cannot be achieved at a DTT molarity of less than about $1.0 \times 10^{-3}$M, which is about 1.3 times the theoretical amount required, irrespective of reaction time. To produce 6 —SH groups within one hour requires a molarity of at least about $1.6 \times 10^{-3}$M, about 1.67 times the theoretical amount. In the upper curve of the figure, the number of —SH groups formed during reduction was determined from the carboxymethylcysteine content of an acid hydrolysate of the chemically modified ISG. During acid hydrolysis the iodoacetamide-alkylated cysteine residues are converted to carboxymethyl cysteine so that quantitation of this residue gives the number of mercapto groups alkylated. In the lower curve, $^{14}$C-iodoacetamide was used to block the mercapto groups so that the number of groups alkylated could be obtained from radioactive measurements. The carboxymethyl cysteine values are somewhat greater and are believed to be more quantitatively accurate due to the nature of the experiments.

Depending upon the degree of reduction, the reduced serum immune globulin will contain a mixture of intact IgG chains substantially all ( 93 percent) of which have at least one interchain disulfide group cleaved. The reduced mixture is characterized by having an $H_2L_2$ content of less than 7 percent, an $H_2L_2 + H_2L + H_2$ content (molecules having two heavy chains still linked by at least one interchain disulfide linkage) of 5–30 percent and a corresponding $HL + H + L$ content (molecules in which all of the interchain disulfide linkages joining the heavy chains have been cleaved) of 95–70 percent. The $H_2L_2$ molecules remaining may be $IgG_2$ and $IgG_3$ molecules having at least one of their plurality of interchain disulfide linkages linking heavy chains cleaved, since the final product is essentially devoid of anticomplement activity. In any event, in over 93 percent of the molecules at least one of the chains of the IgG molecule has been cleaved from the molecule in intact form, leaving one or more chains intact.

The product of the reduction step, viz., reduced but otherwise substantially unmodified immune serum globulin having from about 2.8 to 4.75 interchain disulfide linkages reduced to about 5.6 to 9.5 —SH pairs, is then converted, usually without intermediate purification or isolation, to a stable final product in the alkylation step. However, if desired, the reduced protein can be isolated, e.g., by precipitation, and new aqueous solvent employed, so long as conditions are employed which do not cause the appearance of anticomplement activity prior to the alkylation step.

Alkylation Step

In the alkylation step, the —SH groups of the product of the reduction step are alkylated. Sufficient alkylating agent is employed to react with any residual reducing agent and to convert all of the free —SH groups present in the reduced product to alkylated mercapto groups. This ensures that anticomplement activity will not reappear, either upon work-up during storage.

The alkylation of the free —SH groups prevents the formation of actual or latent anticomplement activity. The exact nature of the alkylating agent is not critical, so long as the resulting alkylated mercapto group is stable and physiologically acceptable.

In a preferred embodiment, the alkylated mercapto groups have the formula —S—CH$_2$—R wherein R is —H, —CH$_3$, —COOH, COO—LA, —CONH$_2$, —CONH—LA, —CON(LA)$_2$, —C≡N, —CH$_2$C≡N, —Ph, —COPh,

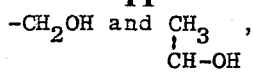

in which LA is lower alkyl, i.e., of 1-4 carbon atoms, and Ph is unsubstituted phenyl or phenyl bearing 1-3 simple substituents such as, for example, lower alkyl, chloro, bromo, nitro, amido, lower-alkoxy, carbolower-alkoxy, etc., e.g., p-tolyl, sym.xylyl, p-amidinophenyl, m-chlorophenyl and p-methoxyphenyl. The alkylated mercapto group can also be

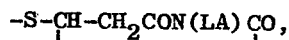

$-S-$(lower-alkoxycarbonyl)LA, e.g., -ethoxycarbonyl-ethylmercapto, and $-S-$(carboxy)-LA, e.g., -carboxyethylmercapto, or other lower-alkylmercapto group bearing a functional group on the -carbon atom of the alkyl group. Iodoacetamide is the preferred alkylating agent, alkylating the free —SH groups to form carbamidomethylmercapto groups.

The reaction conditions employed are those conventionally used with the selected alkylating agent. With the very reactive agents, between about 5 and 10 molar equivalents are generally employed, the exact amount depending in part on the reaction temperature and time, concentration of the protein and alkylating agent in the solution and the number of free —SH groups per molecule. With less reactive alkylating agents, e.g., ethylene oxide, a large molar excess may be required to achieve the desired complete alkylation of all free —SH groups.

To fully alkylate the product of the reduction step, at least two molar equivalents of alkylating agent, calculated on the DTT or DTE employed in the reduction step, usually is required. Preferably, about a 10 percent or greater molar excess is employed to ensure complete alkylation of all residual DTT or DTE and the conversion of all protein —SH groups to —SCH$_2$—R groups. For example, if DTT or DTE is employed at 15 ¼ $10^{-4}$ molarity initial concentration in the reaction mixture, the preferred initial molarity of the alkylating agent in the reaction mixture is about 33 ¼ $10^{-4}$. When employing a gaseous alkylating agent, e.g., ethylene oxide, a larger molar excess, e.g., 10 to 50 molar equivalents or more, may be required to completely alkylate all free —SH groups. Larger molar excesses can be employed, e.g., up to 20 molar equivalents, without detrimental results, since the excess alkylating agent is later separated from the alkylated product after the alkylation step, e.g., by precipitating the protein or by dialysis.

The alkylation conditions are substantially the same as those employed in the reduction step, except somewhat longer reaction times, e.g., 1–2 hours, are usually employed. When iodoacetamide is employed, it can be added as a solid or as a solution. As in the reduction step, the course of the reaction can be monitored, in this case by assaying for free —SH groups. Since the presence of free —SH groups in the protein molecule can permit reappearance of anticomplement activity, the reaction product should be as free as possible of —SH groups, i.e., no more than a trace. Such complete alkylation of —SH groups also prevents subsequent aggregation of gamma globulin molecules.

The alkylation of the —SH group produced by reduction of the interchain disulfide linkages is preferably accomplished in the process of this invention with iodoacetamide to produce pairs of —SCH$_2$CONH$_2$ groups. However, as stated above, the —SH groups can also be blocked by alkylating the reduced ISG with another alkylating agent to produce a modified ISG having substantially the same physical and biological properties as that in which cleaved interchain disulfide linkages are replaced by pairs of —SCH$_2$CONH$_2$ groups.

Alkylation of the —SH groups to give —S—CH$_2$—R groups wherein R is hydrogen or methyl can be accomplished by treating the reduced immune serum globulin with, for example, methyl and ethyl iodide, respectively. Substituted alkylthioethers can also be formed employing a haloacetamide, N-alkyl-halo-acetamide or N,N-dialkyl--haloacetamide, e.g., BrCH$_2$CONHC$_3$H$_7$ and BrCH$_2$CON(C$_2$H$_5$)$_2$; haloacetic ester, e.g., ICH$_2$CO$_2$C$_2$H$_5$ and ClCH$_2$CO$_2$C$_2$H$_5$, haloacetic acid, e.g., ICH$_2$CO$_2$H; haloacetonitrile, e.g., ICH$_2$CN; alkenylnitrile, e.g., acrylonitrile; aralkyl halide, e.g., benzyl bromide; alkylene oxide, e.g., ethylene oxide; phenacylhalide, e.g., phenacyl chloride and phenacyl bromide; N-alkylmaleimide, e.g., N-ethylmaleimide, -halo-lower-alkanoic acids of 3 or 4 carbon atoms and lower-alkyl esters thereof, e.g., ethyl -bromopropionate and -bromopropionic acid. The alkylation reactions are conducted at midly alkaline conditions.

A modified ISG is thus obtained having substantially all interchain disulfide bonds replaced by pairs of other —S—CH$_2$—R groups and other properties of the modified serum globulins of this invention.

Isolation of the Modified ISG

In order to produce a pharmaceutically acceptable product adapted for intravenous administration, it is necessary to separate the novel modified ISG from the non-proteinaceous reaction products and reactants. This can be done in a variety of ways, e.g., ion exchange chromatography, gel permeation chromatography, ultracentrifugation or, preferably by dialysis or by precipitation of the modified ISG, e.g., with a water miscible organic solvent, e.g., methanol, ethanol, etc. Where a more dilute than desired solution of the modified ISG is obtained, ultrafiltration can also be used effectively to concentrate the solution to the desired protein concentration.

In a preferred procedure, preferably after diluting the protein solution with water to a protein concentration of about 1.5 percent, the modified immune serum globulin is precipitated with ethanol under approximately the same conditions as the well-known Cohn process for obtaining Precipitate II from Supernatant III. This precipitate is collected and washed, preferably at least twice with ethanolic buffer solution under pH and temperature conditions and ethanol concentrations which will not redissolve the protein but will remove all measurable amounts of residual reactants and non-protein products. The material is then dried in a conventional manner, e.g., the method employed for drying Cohn Fraction II, and is ready for sterile packaging for intravenous use after reconstituting to the desired protein concentration in a pharmaceutically acceptable carrier adapted for intravenous administration.

In another preferred procedure, a concentrated, e.g., 15–18 percent, ISG solution is employed as starting material and the product of the alkylation step is dialyzed until free of non-proteinaceous components of the reaction product. The resulting modified ISG can be sterile filtered and sterile filled into containers, e.g., 10 cc. vials, for use as such or for lyophilization. Alternatively, or to insure complete removal of reagents, the dialyzed solution can be further processed as described above, viz., precipitation of the modified ISG, washing of the precipitate and reconstituting to a desired protein concentration in a pharmaceutically acceptable carrier. Where a more dilute than desired solution of the modified ISG is obtained, ultrafiltration can also be used effectively to concentrate the solution to the desired protein concentration.

Novel Immune Serum Globulin

The modified gamma globulin of this invention is substantially free from anticomplement activity, both immediate and latent. Its apparent molecular weight is substantially unchanged. It sediments maininly at 7S in the ultracentrifuge, with about 10–15 percent of the 9S component that is also present in unmodified gamma globulin produced by Cohn fractionation. Its gel filtration chromatography pattern on polyacrylamide beads (Bio-Gel P–300) in tris buffer, pH 8.0, shows a major peak comprising 80–90 percent of the total protein at a molecular weight of 160,000, with little or no fragments of lesser size. However, gel chromatography under dissociative conditions, as in 1 M acetic acid, shows the product to consist predominantly of intact but cleaved separate light (L) chains and heavy (H) chains plus a significant proportion (10–45 percent, usually about 12–40 percent) having 2 or 3 intact chains still joined together (HL, $H_2$ and $H_2L$) and a minor amount ( 7 percent, usually less than 6 percent) having all four chains ($H_2L_2$).

Antibody titer is not significantly different from the starting unmodified gamma globulin, i.e., it is normal or hyperimmune, e.g., tetanus or rabies hyperimmune globulin, depending on the antibody titer of the starting unmodified globulin. The antibody molecules are bivalent, as indicated by their ability to precipitate with antigen. Quantitative precipitation with tetanus toxoid indicates that 65–80 percent of the precipitating antibodies to tetanus are retained after chemical modification of a tetanus immune globulin. The novel ISG conveys passive protection against tetanus toxin as confirmed by studies on laboratory animals. The half-life survival of the novel chemically modified gamma globulin in humans and in laborabory animals is substantially no different from that of unmodified gamma globulin.

Another characterizing feature of the modified ISG of this invention is its absence of proteolytic activity. It is known that some samples of ISG form fragments when stored. Such fragmentation is due to proteolytic digestion by a contaminating enzyme often presumed to be plasmin. Fragmentation is undesirable since it causes a decrease in the amount of active antibody in solution. The process of this invention sharply decreases the proteolytic activity in ISG to undetectable levels or at most to trace levels. Other experiments have shown that chemically modified gamma globulin has 0.004 casein units/ml. (a measure of non-specific proteolytic activity) compared with the starting material which contains 0.03 casein units/ml. Thus, the novel process of this invention abolishes proteolytic activity in the gamma globulin, which increases the product stability.

It is also known that heating ISG will cause aggregation of molecules to form higher molecular weight proteins and greatly increase anticomplement titer, e.g., from 16 to over 500. In contrast to the intravenous injectable gamma globulin prepared by heat treatment at pH 4.0 or by limited plasmin treatment, the novel ISG does not appreciably fix complement when purposely aggregated by treatment with heat or with acid followed by neutralization. The process of this invention eliminates this magnified anticomplement activity and brings anticomplement activity back to about zero values. It does not regain significant anticomplementary activity when stored for 2 years at 5 C. as a sterile solution suitable for I.V. administration.

The thus-alkylated reduced immune serum globulin is characterized by consisting essentially of intact immune serum globulin chains having intact interchain disulfide linkages and cleaved at at least one interchain disulfide linkage, each cleaved disulfide linkage being replaced by a pair of alkylated mercapto groups, the cleaved chains remaining united by non-covalent association so that the apparent molecular weight of the modified serum globulin in non-dissociating solvents is substantially the same as unmodified immune serum globulin, said modified immune serum globulin being substantially free from both actual and latent anticomplement activity and having substantially the biological half-life and antibody spectrum of activity of corresponding unmodified immune serum globulin, said modified immune serum globulin having an $H_2L_2$ content of less than 7 percent, and $H_2L_2 + H_2L + H_2$ content of 5–30 percent and an HL + H + L content of 95–70 percent wherein H is an intact heavy chain and L an intact light chain, and having an S-alkylated cysteine content of about 5.6 – 9.5 moles per mole immune serum globulin.

Intravenously Injectable Compositions

The modified ISG of this invention is primarily intended for intraveneous administration. The composition aspect of this invention therefore relates to pharmaceutical compositions comprising a solution, in a pharmaceutically acceptable aqueous carrier adapted for intravenous administration, of an intravenously injectable modified ISG of this invention. The modified ISG is substantially pure. It is substantially free of unmodified serum globulin, of fragments of ISG chains and of any non-proteinaceous reactants or products of the reduction and alkylation reactions. The modified ISG is present in these solutions in any concentration, either suitable for immediate I.V. administration or after dilution, e.g., with isotonic saline solution, to acceptable levels, e.g., about 1–18 percent solution, preferably about 1–15 percent and more preferably about 10 percent for immediate administration, and about 16 percent for dilution prior to administration. These solutions are sterile and free of particulate matter. A variety of aqueous solvents for the protein can be employed, e.g., water, buffered water, 0.4 percent saline, 0.3 molar glycine, etc. The aqueous vehicles conventionally employed for unmodified ISG or hyperimmune serum globulin can be employed, except materials which would produce an untoward reaction upon I.V. administration. The modified ISG can be administered intravenously alone or in combination with or in conjunction with other blood products, e.g., whole blood, plasma, fibrinogen, clotting factors and albumin.

In its method of use aspect, this invention relates to the intravenous administration, usually to humans, of a pharmaceutical composition as defined above. The composition is administered in a conventional manner, e.g., in an amount which provides adequate therapeutic amounts of antibody. For a 16.5 percent protein solution, about 1–25 ml. is the customary single dose. Administration of subsequent dosages is usually within 1–3 weeks, depending upon the severity of the illness and the time of exposure thereto.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Starting materials for the following examples of the chemical modification procedure were prepared as described below:

PREPARATION

1. Cohn Fraction II paste containing approximately 30 percent gamma globulin was suspended at 5 C. in a glycine-saline buffer to give a solution containing approximately 5 percent gamma globulin, 2.25 percent glycine and 0.45 percent sodium chloride with a pH of approximately 6.5.

2. Lyophilized Fraction II paste, whose protein content is approximately 100 percent gamma globulin, was dissolved at 25 C. in 2.25 percent glycine, 0.45 percent saline buffer, pH 6.8, to give a final solution containing approximately 5 percent protein.

3. A commercially available 16.5 percent solution of immune serum globulin in glycine-saline buffer was diluted with additional buffer to give a final solution containing approximately 5 percent protein.

The Fraction II paste, powder or solution was obtained by the Cohn fractionation of pooled plasma from normal human donors, or from pooled plasma of selected donors having high titers of a particular antibody, e.g., antibodies to tetanus, rabies or hepatitis-associated antigen.

The protein concentration was determined spectrophotometrically by usisng a specific extinction coefficient of
$E_{1cm.}^{1\%} = 13.8$ at 280 m.

EXAMPLE 1

A solution containing 750 g. of tetanus immune globulin, prepared according to (1), in 15 l. of glycine-saline buffer, was warmed to 22 C. and the pH was adjusted to 8.2 by the addition of 130 ml. of 1 N NaOH. A solution containing 3.47 g. (0.0225 mole) of dithiothreitol (DTT) in 23 ml. of glycine-saline buffer was added to give a dithiothreitol concentration of 0.0015 M in the reaction mixture. The solution was stirred for 15 minutes and then a solution containing 9.15 g. (0.0494 mole) of iodoacetamide (IAM) in 229 ml. of glycine-saline buffer was added, giving an iodoacetamide concentration of 0.0033 M in the reaction mixture. The pH of the solution was maintained at 8.1 to 8.2 during the next two hours by addition of 1 N NaOH as necessary. The reaction mixture was then adjusted to a pH of 6.80 by addition of 245 ml. of 1 N HCl and cooled to 5 C. The solution was worked up in the following two ways:

a. A 50 ml. portion of the reaction mixture was dialyzed against several changes of 2.25 percent glycline 0.45 percent NaCl buffer, pH 6.8. The dialysate was concentrated by ultrafiltration to a volume of about 25 ml. and sterile filtered through a 0.22 micron membrane. The sterile solution is a product, suitable for intravenous injection in humans and contains 8.6 percent protein as measured spectrophotometrically.

b. The remainder of the reaction mixture (15.1) was diluted with 19.2 l. of cold water. The chemically modified gamma globulin was recovered from this solution by precipitation at 5 C. with cold ethanol similar to the Cohn method 9 conditions and the gamma globulin paste was collected by centrifugation. The moist paste was then washed with two 10 L. portions of glycine-saline buffer containing sufficient ethanol to prevent dissolution of the gamma globulin. These washes removed any residual reactants entrapped in the precipitated gamma globulin. The moist paste was then lyophilized to yield 560 g. of dry, chemically modified gamma globulin. A solution containing approximately 10 percent protein was prepared by dissolving 529 g. of the powder in 4.5 liters of 2.25 percent glycine — 0.45 percent saline buffer, pH 6.8. This solution was then sterile filtered to give a product suitable for intravenous administration in humans. This solution of the novel modified ISG can, e.g., be sterile filled into single dose 10 cc. ampoules which are then sealed in a conventional manner with a covered rubber stopper.

Anticomplement activity was measured by a standard dilution assay. Typically, 0.2 ml. of two-fold serial dilutions of the test substance were incubated for 2 hours at 37 C. with two "full" units of guinea pig complement in 0.4 ml. of saline. (One full unit of complement is that amount which causes complete hemolysis of 0.4 ml. of a 1 percent suspension of sensitized sheep erythrocytes). The residual complement was then determined by addition of 0.4 ml. of a 1 suspension of sensitized sheep erythrocytes and incubation for an additional 30 minutes at 37 C. The degree of hemolysis was estimated visually and the anticomplement titer was taken to be the greatest dilution of test substance which gave at least 50 percent hemolysis.

The starting material for Example 1 had an anticomplement titer of 1:512 when tested at 10 percent protein by this assay. The chemically modified product isolated by either method (a) or method (b) had an anticomplement titer of less than 1:1, e.g., no hemolysis was observed in the undiluted sample. The chemically modified product according to this invention thus binds substantially no complement and is, thus, substantially free of anticomplement activity.

The product of Example 1 (b) was found by amino acid analysis to contain 7.7 —S—CH$_2$CONH$_2$ groups per molecule of modified gamma globulin. This result was calculated from an acid hydrolyzate of the product by using a molecular weight of 160,000 for gamma globulin and determining the number of carboxymethyl cysteine residues per molecule of gamma globulin. The product of Example 1(b) was assayed for tetanus antibodies by the quantitative precipitin technique. One ml. of a 10 percent solution of the product was found to precipitate 163 Lf units of tetanus toxoid, while one ml. of a 10 percent solution of the unmodified gamma globulin precipitated 198 Lf units. There was thus a retention of 82 percent of the precipitating antibodies to tetanus after chemical modification.

Gel diffusion against tetanus toxoid and against Streptococcus antigen Group A showed substantially the same antibody content for the chemically modified product and the unmodified starting material.

Figure 2:
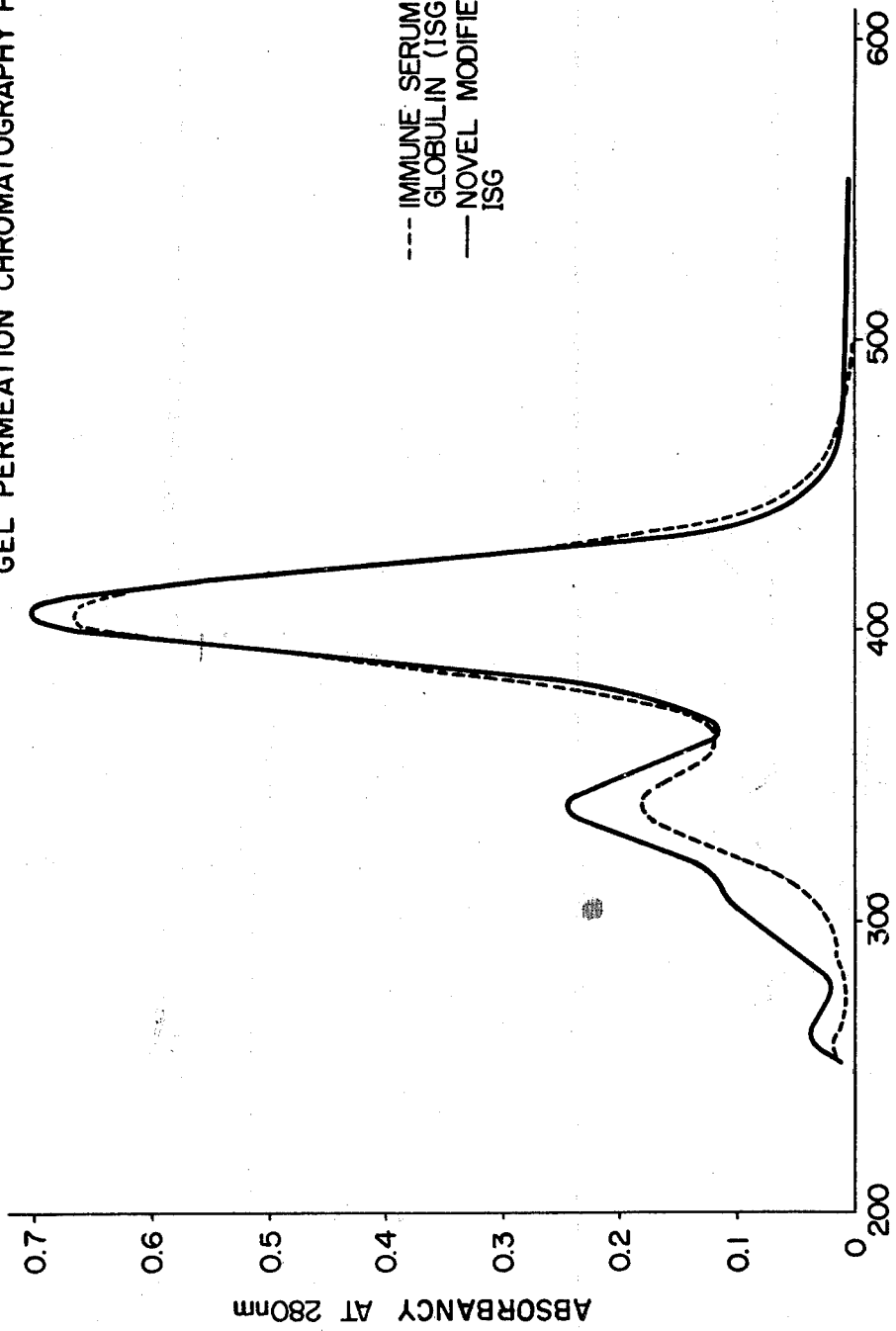
FIG. 2 is a graph comparing the molecular size distribution by gel permeation chromatography of the starting immune serum globulin employed in Example 1(b) with that of the novel modified immune serum globulin, in accordance with data shown in Table 1.

The molecular weight of the major component in immune serum globulin is unaffected by the chemical modification procedure. In FIG. 2, the gel filtration pattern on Bio-Gel A–0.5m of the product of Example 1(b) is compared to that of the unmodified starting material. This gel filtration was performed in a tris buffer at pH 8.0. When gel filtration is performed in 1 M acetic acid, the product of Example 1(b) shows a peak containing approximately 17 percent of the total protein which has a molecular weight corresponding to free light chains.

In an aqueous solution at pH 7, the product of Example 1 consisted of 83.7 percent 6.68S, 14.5 percent 9.73S and 1.7 percent 12.1S when analyzed in the ultracentrifuge. No fragments sedimenting at less than 6S were detected.

EXAMPLE 2

A solution containing 190 g. of tetanus immune globulin in 3.54 l. of glycine-saline buffer was prepared according to Method 2. The solution was warmed to 22 C. and the pH adjusted to 8.35 by addition of 45 ml. 1 N NaOH. This solution was treated with 1.38 g. (0.0090 mole) of dithiothreitol in 9 ml. of glycine-saline buffer and reduction was allowed to proceed for 10 minutes. This mixture was then alkylated by the addition of 1.82 g. (0.010 mole) of iodacetamide in 45 ml. of glycine-saline buffer. After 2 hours, the pH of the reaction mixture was reduced to 6.75 by the addition of 50 ml. 1 N HCl. This reduced and alkylated gamma globulin solution was worked up in a manner similar to that described in Example 1, method (b). There was thus obtained 156 g. of lyophilized powder, which was dissolved in glycine-saline buffer and sterile filtered to give a 10 percent protein solution suitable for intravenous injection. The product had an anticomplement titer of 1:1, while that of the unmodified starting material was 1:512, both assays utilizing 10 percent solutions. After storage for 18 months at 5 C., the chemically modified product had an anticomplement titer of 1:2. When reassayed at 19 months, the titer was 1:1.

Amino acid analysis of the modified ISG indicated 6.7 $-SCH_2CONH_2$ residues per molecular weight of 160,000. Gel filtration patterns substantially the same as those for the product of Example 1 were obtained. The chemically modified product sedimented as 80 6.84S, 17 percent 9.86S, and 3 $-10,-S$ in the ultracentrifuge.

The modified ISG was compared to the unmodified starting material in ability to confer passive protection to guinea pigs subsequently challenged with 100 MLD of tetanus toxin. A 50% passive protection end-point of 7 days for unmodified starting material and 8 days for the chemically modified product was observed. The results are in accord with the accepted immunological end-point of 9 days for human gamma globulin in guinea pigs.

The in vivo half-life of the modified ISG was determined to be 2.3 days in guinea pigs, compared to 2.5 days for the unmodified starting material.

In agammaglobulinemic patients, the mean plasma survival half-life time of the modified ISG was found to be 22.4 days. The infusions were safe and well tolerated.

EXAMPLE 3

To 6 ml. of 17.3% solution of rabies immune globulin in glycine-saline buffer there was added 15 ml. of additional glycine-saline buffer to give a solution containing 5.04 percent protein. Fifteen ml. of this solution was warmed to room temperature and adjusted to pH 8.2 with 1 N NaOH. The solution was stirred and treated with 0.10 ml. of a 0.225M dithiothreitol solution prepared in glycine-saline buffer. After 10 minutes there was added 0.20 ml. of 0.25M iodoacetamide in glycine-saline buffer. The pH, which had dropped to 8.10, was raised to 8.25 by addition of 0.1 N NaOH. After 2 hours, the reaction mixture was dialyzed against glycine-saline buffer, pH 6.85, and sterile filtered through a 0.22 micron filter. The resulting sterile, chemically modified rabies immune globulin solution contained 3.3 percent protein as determined spectrophotometrically.

This product was tested by in vivo mouse protection assay which indicated a somewhat lower numerical titer of protective anitbody against rabies virus (1 : 1100) than the unmodified rabies immune globulin (1 : 2000). Because of variations inherent in the bioassay procedure, this difference is not considered to be significant. Anticomplement activity (5 percent solution) of the modified ISG was negative, compared to a titer of 1:32 for the starting ISG.

EXAMPLE 4

Sixty grams of Fraction II paste were dissolved in a glycine-saline buffer according to Method 1 to give 422 ml. of solution containing 4.86 percent protein. This solution was adjusted to pH 8.2 and divided into 40 ml. aliquots. Each sample was reduced with dithiothreitol (DTT) and alkylated with iodoacetamide (IAM) as indicated in Table I. Following alkylation for the time indicated, each sample was dialyzed against glycine-saline buffer until freel of non-proteinaceous reactants and reaction products. The samples were concentrated to approximately 10 percent protein by ultrafiltration. Sterile filtration through a 0.22 micron sterile filter provides a sterile solution suitable for intravenous administration (Samples 4–7).

Each of the nine samples were assayed for antibodies to Streptococcus Group A antigen. Samples 2 through 8 contained approximately the same quantity of antibody as the untreated sample number 1, while the antibody content of sample 9 was very markedly reduced to an undetectable level. The above samples were hydrolyzed with acid and the hydrolyzates were subjected to amino acid analysis to determine the number of $-S-CH_2CONH_2$ groups per molecule of gamma globulin. Anticomplement activity of the samples were determined by the method described in Example 1. The results of the anticomplement assay, antibody activity and amino acid analysis are summarized in Table I.

TABLE I

| Example | Sample No. | DTT Conc. (mM) | Reduction Time (min.) | IAM Conc. (mM) | Alkylation Time (min.) | Anti-Complement Titer | $-SCH_2CONH_2$ moles/1.6 ¼ $10^5$ g. | Antibody to Strep Type A Antigen |
|---------|-----------|----------------|----------------------|----------------|------------------------|----------------------|--------------------------------------|----------------------------------|
| A | 1 | — | — | — | — | 1:128 | 0 | + |
| B | 2 | 0.5 | 10 | 1.1 | 120 | 1:128 | 3.00 | + |
| C | 3 | 1.0 | 10 | 2.2 | 120 | 1:8 | 5.78 | + |
| D | 4 | 1.5 | 5 | 3.3 | 120 | 1:2 | 7.50 | + |
| E | 5 | 1.5 | 10 | 3.3 | 120 | 1:1 | 7.40 | + |
| F | 6 | 1.5 | 60 | 3.3 | 120 | 1:1 | 7.27 | + |
| G | 7 | 1.5 | 10 | 3.3 | 30 | 1:1 | 8.13 | + |

TABLE I-continued

| Example | Sample No. | DTT Conc. (mM) | Reduction Time (min.) | IAM Conc. (mM) | Alkylation Time (min.) | Anti-Complement Titer | $-SCH_2CONH_2$ moles/1.6 ¼ $10^5$ g. | Antibody to Strep Type A Antigen |
|---|---|---|---|---|---|---|---|---|
| H | 8 | 1.5 | 10 | — | — | 1:128 | 0 | + |
| I | 9 | 5.0 | 60 | 11.0 | 120 | 1:1 | 8.13 | * |

*undetectable level

These results indicate that reduction at the 0.015M dithiothreitol level for 10 minutes, followed by 2 hour alkylation with 0.0033M iodoacetamide (Sample 5) gives a product substantially free of anticomplement activity and containing 7.4 $-SCH_2CONH_2$ groups per molecule of gamma globulin, with no apparent decrease in antibody content. Reduction for 60 minutes (Sample 6) or 5 minutes (Sample 4) or alkylation for 30 minutes instead of 120 minutes (Sample 7) gave products essentially identical to Sample 5. However, loss of anticomplement activity was incomplete using lower levels of dithiothreitol (Samples 2 and 3). Although the anticomplement activity was low in Sample 9 (reduced at high DTT for 60 min.), antibody function was destroyed.

EXAMPLE 5

A commercially available solution of gamma globulin, consisting of 16.5 percent tetanus immune globulin, was reduced at room temperature with dithiothreitol (0.0075M) for 1 hour and alkylated with iodoacetamide (0.00325M) for 2 hours in the manner described in Example 1. The reduction time of 1 hour is longer than necessary to achieve maximum reduction. The resulting product was dialyzed against glycine diluent until free of the non-proteinaceous portion of the reaction product, sterile filtered and sterile filled into 10 ml. vials suitable for human administration. Tetanus antibody values of 127 Lf units and 110 Lf units, and anticomplement assay values of 1:256 and 1:4 were observed for control and chemically modified samples, respectively. This procedure has the advantage that the modified globulin is obtained at the desired final concentration of 16.5 percent and need not be concentrated for final packaging.

EXAMPLE 6

The gamma globulin blood serum levels of agammaglobulin emic patients are raised to at least the levels achieved by the intramuscular administration of 10 ml. of a 16.5 percent solution of unmodified ISG, by the I.V. administration of 16.5 ml. of a 10 percent solution of the modified ISG of Example 4E or 4F in sterile 0.3 M glycine, 0.45percent NaCl. Half-life times are substantially the same.

EXAMPLE 7

The I.V. administration of 1 ml. of a 16.5 percent solution of hyperimmune ISG (250 tetanus antibody units per ml. of a 16.5 percent solution). modified according to Example 4F in 0.3 M glycine, 0.45 percent NaCl, achieves at least the immunological effect as the I.M. administration of a like dose of the starting hyperimmune ISG ("Hyper-Tet", Cutter Laboratories, Inc., Berkeley, Cal.).

EXAMPLE 8

Fifty milliliter aliquots of a 5 percent solution of tetanus immune globulin (1.56 ¼ $10^{-5}$ mole) in glycine-saline buffer were reduced as shown in Table II with DTT or DTE at a concentration of 1.5 mM and at a pH of 8.5 for 15 minutes at 25 C. The solution was then treated at 25 C. for 2 hours with an alkylating agent shown in Table II, at a concentration of 3.3 mM, except in the case of ethyleneoxide (90 mM). The pH was then adjusted to 7.0 with 1N hydrochloric acid and the solution dialyzed against glycine-saline solution to remove excess reagents and side reaction products.

The products were assayed for anticomplement activity by the method described above. The retention or loss of tetanus antibody activity was determined by single radial diffusion, employing a layer of agarose gel containing tetanus toxoid. Samples of starting unmodified immune globulin and the chemically modified immune globulin are applied to wells cut in the gel and allowed to diffuse into the agarose containing the toxoid for 24 hours or longer. The area of the ring-shaped precipitation band is proportional. to the amount of antibody in the well (G. Mancini et al., Immunochemistry 2, 235, 1965).

The degree of reduction and alkylation was determined by electrophoresis of the modified tetanus immune globulin in polyacrylamide gel in the presence of sodium dodecylsulfate (SDS). Using this gel, there is a linear relationship between mobility and the logarithm of the molecular weight of the migrating species over the molecular weight range of 20,000 to 350,000 daltons (K. Weber and M. Osborn, J.Biol.Chem. 244, 4406, 1969). The presence of SDS further insures that all non-covalent interactions between the chains of gamma globulin are disrupted. Samples of reduced and alkylated gamma globulin show six bands under these conditions, corresponding to $H_2L_2$, $H_2L$, $H_2$, HL, H, and L chains, in order of decreasing molecular weight (increasing mobility). Unreduced gamma globulin shows only the $H_2L_2$ band. If complete reduction followed by alkylation of the immune serum globulin is carried out, i.e., in the presence of high concentrations of urea, guanidine or SDS, so that all interchain disulfide bonds are cleaved, the resulting polyacrylamide gel pattern shows only H and L chains. Under the conditions of reduction and alkylation described above. from about 10 to 85 percent of the applied protein migrates as H and L chains. This value is taken as a measure of the degree of reduction. Quantitation of the gel electrophoresis patterns was carried out by staining the protein bands with Coomassie Blue, and scanning the stained gels at 570 nm along their length using a a Gilford 240 spectrophotometer with Linear Transport attachment and Brown recorder with Disc integrator.

The SDS-polyacrylamide gels were prepared as follows:

To 10.0 ml. of 1 M tris, 2 M sodium acetate, 0.2 M disodium ethylene-diaminetetraacetic acid buffer adjusted to pH 7.50 with acetic acid is added 2.67 ml. of antibody function was essentially unchanged from that for the control (Example 8A) as determined by the radial gel diffusion test described above.

TABLE II

REDUCTION AND ALKYLATION OF GAMMA GLOBULIN

| Sample No. | Reducing Agent (conc. 1.5 mM) | Alkylating Agent (conc. 3.3 mM) | Electrophoretic Analyses % | | | Anti-complement Titer | S-Alkylated Cysteine Groups Moles/IsG mol. |
|---|---|---|---|---|---|---|---|
| | | | $H_2L_2$ | $H_2L_2 +$ $H_2L +$ $H_2$ | $HL + H + L$ | | |
| A | None | None | — | 90.8 | 9.1 | 1:128 | n.d. |
| B | DTT | None | — | 87 | 13 | 1:256 | n.d. |
| C | DTT | Iodoacetamide | 2.2 | 7.5 | 92.5 | 1:1 | 9.20 |
| D | DTT | Iodoacetamide | 6.2 | 23.1 | 76.9 | 1:1 | n.d. |
| E | DTE | Iodoacetamide | 4.7 | 16.7 | 83.3 | 1:2 | 8.87 |
| F | DTT | Iodoacetic Acid | 4.4 | 14.7 | 85.3 | 1:4 | 8.66 |
| G | DTT | Benzyl Bromide | 4.1 | 22.1 | 81.9 | 1:2 | n.d. |
| H | DTT | Acrylonitrile | 4.4 | 17.4 | 82.6 | 1:2 | 6.53 |
| I | DTT | Phenacyl Bromide | 1.1 | 7.5 | 92.6 | 1:4 | n.d. |
| J | DTT | p-Amidinophenacyl Bromide | 1.3 | 8.2 | 91.9 | 1:1 | n.d. |
| K | DTT | Ethylene Oxide (90 mM) | 2.8 | 12.7 | 87.3 | 1:1 | n.d. |
| L | DTT | Ethyl Chloroacetate | 4.0 | 19.0 | 81.0 | 1:1 | 6.74 |
| M | DTT | Methyl Iodide | 5.3 | 28.1 | 71.8 | 1:4 | 5.67 |
| N | DTT | 2-Bromo-N-propylacetamide | 4.0 | 14.1 | 85.9 | 1:2 | 8.24 |
| O | DTT | 2-Bromo-N,N-diethylacetamide | 4.2 | 14.3 | 85.7 | 1:2 | 8.35 |

DTT, dithiothreitol; DTE, dithioerythritol; n.d., not determined a 37.5 percent acrylamide — 2 percent methylenebisacrylamide solution in water, 0.10 ml of a 20 percent SDS solution in water, 1.20 ml. of a 0.3 percent ammonium persulfate solution in water, and 5.63 ml. of water. The solution is deaerated by application of a vacuum for one minute. Then 0.40 ml. of a 5 percent solution of N,N,N, N-tetramethylethylenediamine is added. The solution is poured into a series of Pyrex tubes 0.6 mm (I.D.) by 75 mm long having the lower ends plugged. Polymerization normally occurs within fifteen minutes, whereupon the plugs are removed and the glass tubes with contained gels are placed in the electrophoresis apparatus. The lower compartment buffer consists of 0.1 M tris, 0.2 M sodium acetate, 0.02 M disodium ethylene-diaminetetraacetic acid adjusted to pH 7.50 with acetic acid. The upper compartment buffer contains in addition 0.1 percent of SDS.

The chemically modified tetanus immune globulin solutions were prepared for electrophoresis by adding 0.20 ml. of the 5 percent solution to 1.0 ml. of the upper compartment buffer and adding 0.05 ml. of 20 percent SDS in water. The solutions were heated to 60 C, for 1 hour, cooled, and 20 microliters applied to the top of the gel. The gels were run simultaneously, applying a current of approximately 80 ma. for 4 hours, and then were removed from the glass tubes for staining.

Finally, in those instances where the reduced and alkylated tetanus immune globulin yielded an easily characterized modified cysteine residue upon hydrolysis, quantitative amino acid analysis of a total acid hydrolysate of the modified material was obtained. The number of alkylated cysteine residues per molecule of modified gamma globulin can then be determined. e.g., in the manner described above.

The anticomplement titers, percentage of dissociated and covalently bonded heavy and light chain combinations after disruption of non-covalent interactions by SDS, and the number of S-alkylated cysteine groups per molecule are listed in Table II. In all examples, the

EXAMPLE 9

To 30 ml. of a 17.3 percent solution of tetanus immune globulin adjusted to pH 8.5 was added an amount of dithiothreitol (DTT) to form a 0.01 molar solution with respect to DTT. The mixture was maintained at 25 C. for 60 minutes and then was treated with N-ethylmaleimide (NEM) in an amount which gave a 0.011 molar solution with respect to NEM. After 30 minutes, the solution was dialyzed against glycine-saline buffer and assayed. The chemically modified tetanus immune globulin had an anticomplement titer of 1:1 and exhibited 1160 units (antibody) per gram of protein by the guinea pig potency test. The starting material had an anticomplement titer of 1:2048 and 1440 units per gram of protein.

EXAMPLE 10

The 10 percent solution of modified tetanus immune globulin containing glycine-saline buffer as described in Example 1(b) was sterile filtered into vials, frozen and lyophilized. Some of the resulting freeze-dried product was reconstituted with sterile water to either 5 or 10 percent solutions. Reconstitution time was only 10 to 15 minutes whereas unmodified ISG requires at least an hour to reconstitute. The reconsituted modified tetanus immune globulin had an AC titer of 1:2 and substantial retention of antibody function. The lyophilized product stored at 37 C. for 6 months showed no change in either AC titer or antibody function.

EXAMPLE 11

A 5 percent solution of hepatitis immune globulin was reacted with 1.5 mM DTT for 10 minutes at R.T., pH 8.20, and then alkylated with excess iodoacetamide for 2 hours at room temperature. The solution was then dialyzed, sterile filtered, and tested for antibody function and AC activity. The AC titer had dropped from 1:256 down to 1:2. By agar gel diffusion against $HB_sAg$ (Heptatitis antigen), or by counterimmune electrophoresis against the same antigen, at least half of the antibody function was retained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pharmaceutical composition comprising a sterile solution, in a pharmaceutically acceptable aqueous carrier adapted for intravenous administration, of an intravenously injectable, substantially pure modified immune serum globulin consisting essentially of intact immune serum globulin chains having intact intrachain disulfide linkages and cleaved at at least one interchain disulfide linkage, each cleaved disulfide linkage being replaced by a pair of alkylated mercapto groups produced by a process which comprises the steps of
    a. selectively reducing to —SH groups at least one interchain disulfide linkage of immune serum globulin with a reducing agent under conditions which leave the intrachain disulfide linkages and the remainder of the molecule substantially intact; and
    b. alkylating all of the thus-produced —SH groups of the thus-reduced ISG by reaction with a molar equivalent excess of an alkylating agent, the cleaved chains remaining united by non-covalent association so that the apparent molecular weight of the modified serum globulin in non-dissociating solvents is substantially the same as unmodified immune serum globulin, said modified immune serum globulin being, in accordance with said process, thereby rendered substantially free from both actual and latent anticomplement activity and having substantially the biological half-life and spectrum of antibody activity of corresponding unmodified immune serum globulin, said modified immune serum globulin having an $H_2L_2$ content of less than 7 percent, an $H_2L_2 + H_2L + H_2$ content of 5–30 percent and an $HL + H + L$ content of 95–70 percent wherein H is an intact heavy chain and L an intact light chain, and having an S-alkylated cysteine content of 5.6 – 9.5 moles per mole immune serum globulin.

2. A composition according to claim 1 wherein the alkylated mercapto groups are —S—$CH_2$—$CONH_2$ groups.

3. A composition according to claim 1 wherein the said modified immune serum globulin has an average of about 5.6–8.5 S-alkylated cysteine groups per molecule.

4. A composition according to claim 3 wherein the alkylated mercapto groups are —S—$CH_2$—$CONH_2$ groups.

5. A composition according to claim 1 wherein the modified serum globulin is hyperimmune.

6. A composition according to claim 5 wherein said modified hyperimmune serum globulin is tetanus immune globulin.

7. A composition according to claim 6 wherein the alkylated mercapto groups are —S—$CH_2CONH_2$ groups.

8. A composition according to claim 5 wherein said modified hyperimmune serum globulin is rabies immune globulin.

9. A composition according to claim 8 wherein the alkylated mercapto groups are —S—$CH_2CONH_2$ groups.

10. A composition according to claim 1 as an about 10 percent solution of the modified immune serum globulin.

11. A composition according to claim 1 wherein the modified serum globulin is hepatitis immune globulin.

12. A composition according to claim 1 as an about 5 percent solution of the modified immune serum globulin.

13. Lylophilized, sterile, substantially pure, and when reconstituted as a 5–10 percent solution, intravenously injectable, modified serum globulin consisting essentially of intact immune serum globulin chains having intact intrachain disulfide linkages and cleaved at at least one interchain disulfide linkage, each cleaved disulfide linkage being replaced by a pair of alkylated mercapto groups produced by a process which comprises the steps of
    a. selectively reducing to —SH groups at least one interchain disulfide linkage of immune serum globulin with a reducing agent under conditions which leave the intrachain disulfide linkages and the remainder of the molecule substantially intact; and
    b. alkylating all of the thus-produced —SH groups of the thus-reduced ISG by reaction with a molar equivalent excess of an alkylating agent, the cleaved chains remaining united by non-covalent association so that the apparent molecular weight of the modified serum globulin in non-dissociating solvents is substantially the same as unmodified immune serum globulin, said modified immune serum globulin being, in accordance with said process, thereby rendered substantially free from both actual and latent anticomplement activity and having substantially the biological half-life and spectrum of antibody activity of corresponding unmodified immune serum globulin, said modified immune serum globulin having an $H_2L_2$ content of less than 7 percent, an $H_2L_2 + H_2L + H_2$ content of 5–30 percent and an $HL + H + L$ content of 95–70 percent wherein H is an intact heavy chain and L an intact light chain, ahd having an S-alkylated cysteine content of 5.6 – 9.5 moles per mole immune sercum globulin.

14. A method for rendering immune serum globulin substantially free from both actual and latent anticomplement activity while retaining substantially the biological half-life and spectrum of antibody activity which comprises the steps of
    a. reducing to —SH groups at a pH of about 7.2 – 9 from about 2.8 to 4.75 of the disulfide linkages of 1–18 percent solution of the ISG with dithioerythritol or diithiothreitol under conditions of time, temperature and ratio of reducing agent to ISG shown in FIG. 4 of the drawings;
    b. alkylating all of the thus-produced —SH groups of the thus-reduced ISG by reaction with a molar equivalent excess of an alkylating agent;
    c. separating the thus-produced modified ISG from the other reaction products and any residual reactants to produce a solution of substantially pure modified ISG; and
    d. sterilizing the solution of the substantially pure modified ISG to render it intravenously injectable 15. A lyophilized modified immune serum globulin according to claim 13 wherein the alkylated mercapto groups are —S—CH$_2$CONH$_2$ groups.

16. In the art of immune serum globulin administration in human therapy, the improvement which comprises administering intravenously a composition according to claim 1.

17. In the art of immune serum globulin administration in human therapy, the improvement which comprises administering intravenously a composition according to claim 5.

18. In the art of immune serum globulin administration in human therapy, the improvement which comprises administering intravenously a composition according to claim 6.

19. In the art of immune serum globulin administration in human therapy, the improvement which comprises administering intravenously a composition according to claim 8.

20. In the art of immune serum globulin administration in human therapy, the improvement which comrpises administering intravenously a composition according to claim 11.

* * * * *

UNITED STATES PATENT AND TRADEMARK OFFICE
CERTIFICATE OF CORRECTION

PATENT NO. : 3,903,262
DATED : September 2, 1975
INVENTOR(S) : Albert R. Pappenhagen, et al It is certified that error appears in the above-identified patent and that said Letters Patent are hereby corrected as shown below:

Title page, First reference, Change "Reducting Degravation" to --Reductive Degradation--.

Title page, Last reference, Change "Barandon" to --Barandum--.

Attorney, Agent, or Firm, Change "Miller" to --Millen--.

Change "1/4" to --x-- in the following occurrences:
Column 1, line 36; Column 7, lines 17 and 18 (4 occurrences); Column 8, lines 64, 67 (2 occurrences), and 68; Column 9, lines 21, 24, 27, 53, 54 and 55 (2 occurences); Column 10, lines 1 and 4; Column 11, lines 40 and 43; (Table 1, under heading "SCH$_2$CONH$_2$"); Column 20, line 15.

Column 1, line 41, Change "elminating" to --eliminating--.

Column 5, line 28, After "gamma globulin," insert -- $\gamma$ --.

Column 11, line 15, Change "-S--(lower....." to --S-$\alpha$-- (lower.....--.

Column 11, line 15, Before "-ethoxycarbonyl-" insert -- $\alpha$ --.

Column 11, line 16, Change "-S-- (carboxy)-" to --S-$\alpha$- (carboxy)--.

Page 1 of 3 pages.

UNITED STATES PATENT AND TRADEMARK OFFICE
CERTIFICATE OF CORRECTION

PATENT NO. : 3,903,262

DATED : September 2, 1975

INVENTOR(S) : Albert Pappenhagen, et al.

It is certified that error appears in the above-identified patent and that said Letters Patent are hereby corrected as shown below:

Column 11, line 16, After "e.g.," insert -- $\alpha$ --.

Column 11, line 18, Change "-carbon" to -- $\alpha$ -carbon--.

Column 12, line 20, Change "-halo-lower-" to -- $\alpha$ - halo-lower- --.

Column 12, line 22, Change "-bromopropionate and-" to -- $\alpha$ -bromopropionate and $\alpha$ ---.

Column 14, line 9, Change "interchain" to --intrachain--.

Column 15, line 35, Change "usising" to --using--.

Column 15, line 37, Change "280 m." to --280 m $\mu$ .--.

Column 16, line 27, Change "a 1 suspension" to --a 1 percent suspension--.

Column 17, line 19, Change "iodacetamide" to --iodoacetamide--.

Column 17, line 38, After "80" insert --percent--.

Column 17, line 39, Change "3-10,-S" to --3 percent 10-11S--.

Column 17, line 45, Change "7 days" to --7-3/4 days--.

Column 17, line 45, Change "8 days" to --8-1/2 days--.

Column 18, line 20, After "by" insert --an--.

Column 18, line 22, Change "anitbody" to --antibody--.

Page 2 of 3 pages.

UNITED STATES PATENT AND TRADEMARK OFFICE
CERTIFICATE OF CORRECTION

PATENT NO. : 3,903,262
DATED : September 2, 1975                    Page 3
INVENTOR(S) : Albert Pappenhagen, et. al.

It is certified that error appears in the above-identified patent and that said Letters Patent are hereby corrected as shown below:

Column 18, line 39, Change "freel" to --free--.

Column 19, line 14, Change "0.015M" to --0.0015M--.

Column 20, line 58, Change "above." to --above,--.

Column 21, line 36, Change "N,N,N,N-" to --N,N,N'N'--.

Column 22, line 55, Change "reconsituted" to --reconstituted--.

Column 24, line 15, Change "Lylophilized" to --Lyophilized--.

Column 24, line 46, Change "ahd" to --and--.

Column 24, line 47, Change "sercum" to --serum--.

Column 24, line 55, After "linkages of" insert --a--.

Column 24, line 57, Change "diithiothreitol" to --dithiothreitol --.

Column 24, line 68, After "injectable" insert a period--(.)--.

Column 26, lines 10 and 11, Change "comrpises" to --comprises--.

Signed and Sealed this third Day of February 1976

[SEAL]

Attest:

RUTH C. MASON
Attesting Officer

C. MARSHALL DANN
Commissioner of Patents and Trademarks